United States Patent [19]

Kulakowski

[11] Patent Number: 4,575,827
[45] Date of Patent: Mar. 11, 1986

[54] SELF-ARCHIVING DATA RECORDING

[75] Inventor: John E. Kulakowski, Tucson, Ariz.

[73] Assignee: International Business Machines Corporation, Armonk, N.Y.

[21] Appl. No.: 611,809

[22] Filed: May 18, 1984

[51] Int. Cl.$^4$ ............................................. G11C 13/00
[52] U.S. Cl. ..................................... 365/230; 365/189
[58] Field of Search ............................ 365/189, 230, 51

[56] References Cited

U.S. PATENT DOCUMENTS 4,419,725 12/1983 George et al. ....................... 364/200
4,419,746 12/1983 Hunter et al. ........................ 365/189

OTHER PUBLICATIONS

IBM Disk Operating System Manual, Personal Computer Language Series, pp. 4-3, 4-4, 4-5, 1981.
Breitenback et al., IBM Technical Disclosure Bulletin, vol. 17, No. 11, Apr. 1975, pp. 3190-3193.
Tennison et al., IBM Technical Disclosure Bulletin, vol. 18, No. 3, Aug. 1975, pp. 619-621.

Primary Examiner—Terrell W. Fears
Attorney, Agent, or Firm—H. F. Somermeyer

[57] ABSTRACT

Data recording is self-archiving by non-delete recording combined with a directory that grows with each recording in a manner that all previous recordings related to the respective files or data sets are pointed to in the directory. Non-delete recording is applicable to those record media exhibiting indelible characteristics, such as write-once optical media and to rewritable media, such as magnetic recording media of all types. Each directory entry is identified by file or data set name and has one field for each data segment currently a part of the file or data set. Each field has a pointer to its represented data irrespective of when it was recorded. Each directory entry also points to the entry associated with the immediately preceding recording operation on any part of the file or data set such that data changes can be traced using the directory. The directory is stored in one address end portion of the data storing medium while the data is stored in the opposite address end portion—the directory is preferably at the low addresses while the data is at the high addresses. The directory recording is at ever increasing addresses while the data recording is at ever decreasing addresses.

25 Claims, 8 Drawing Figures

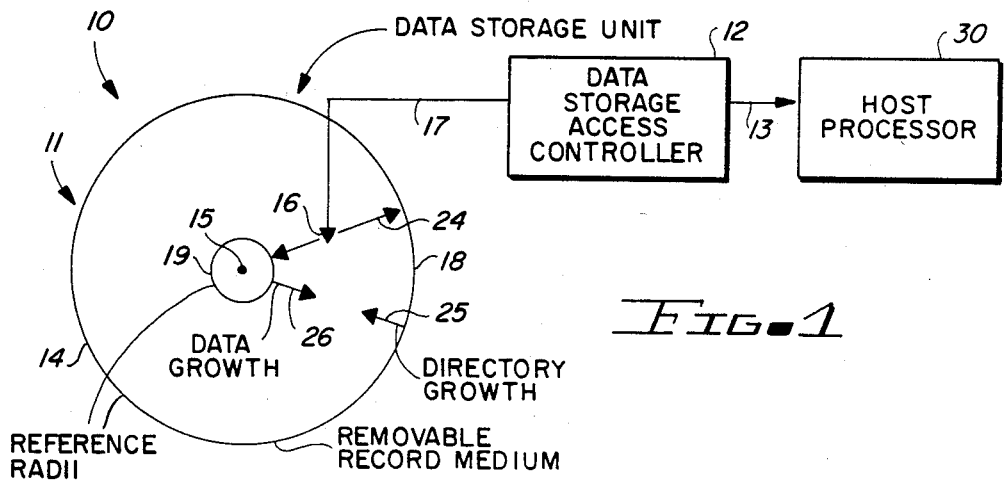
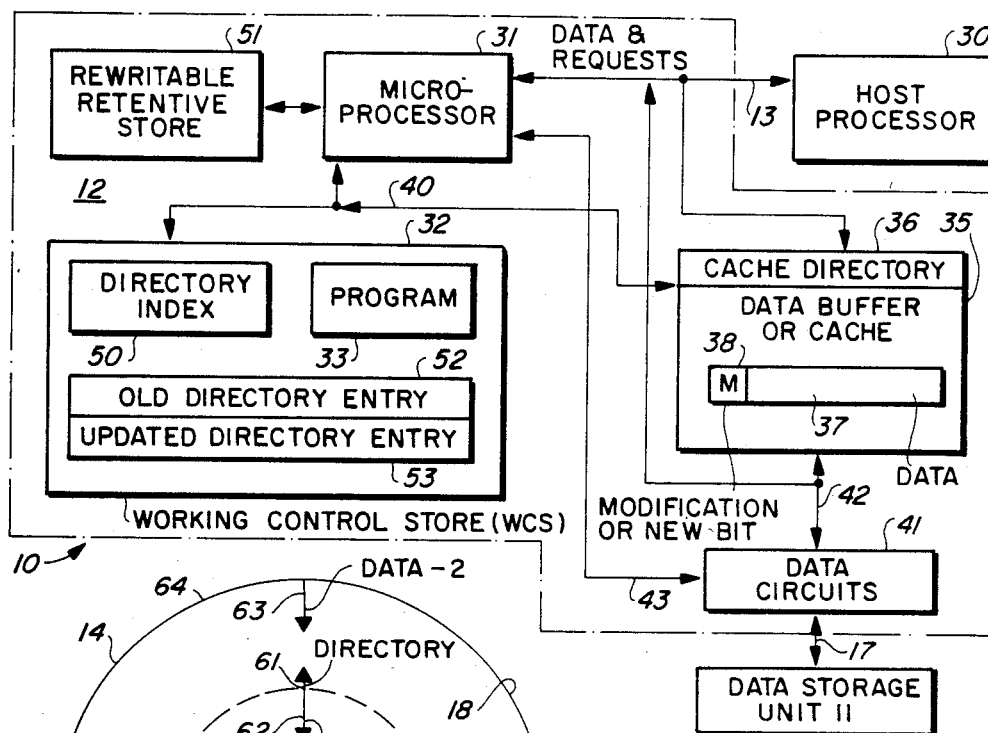
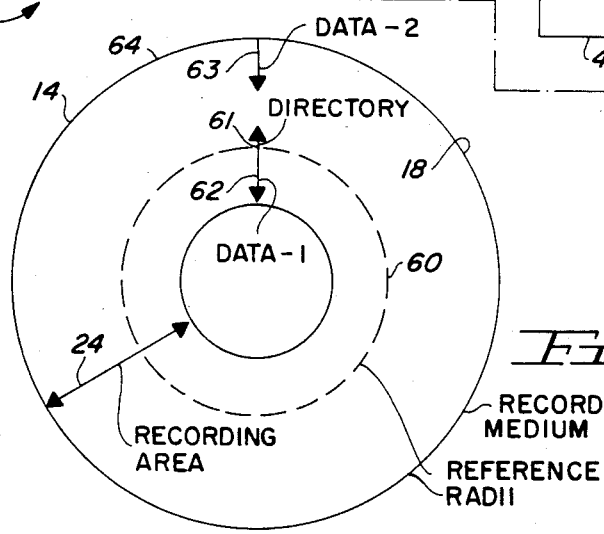

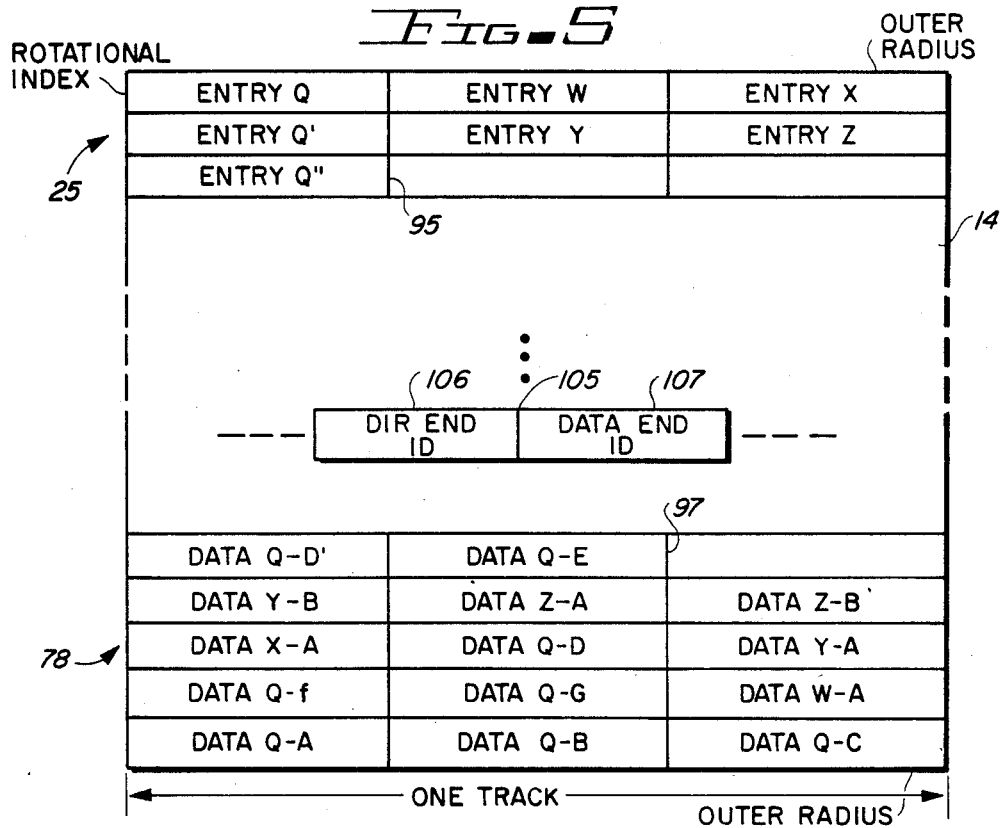
FIG-5
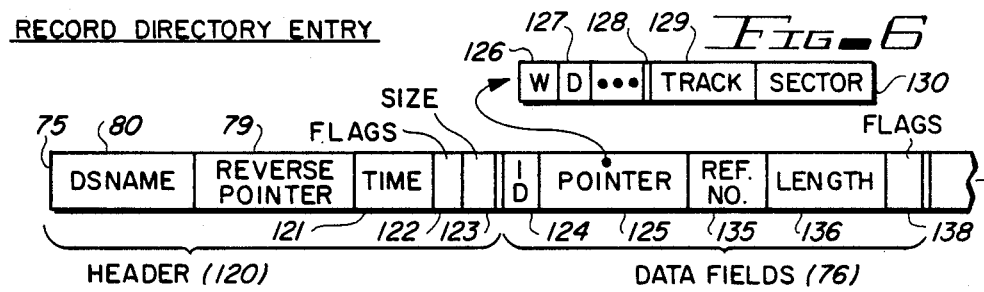
FIG-6
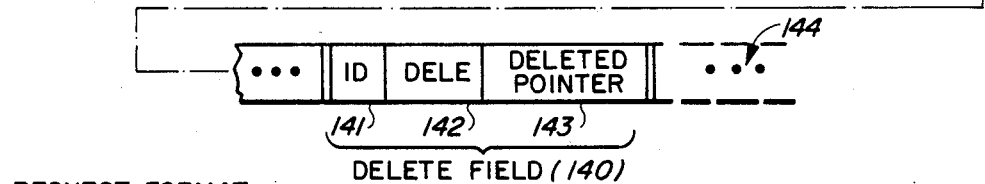
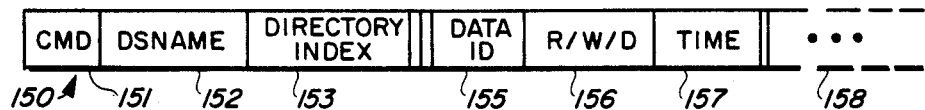
FIG-7

SELF-ARCHIVING DATA RECORDING

FIELD OF THE INVENTION

This invention relates to data recording, particularly to the creation of data address directories for achieving self-archiving recording by employing nondelete recording techniques.

BACKGROUND OF THE INVENTION

Data recording is a major and key portion of all data processing operations. Most data recordings employ rewritable record media, such as magnetic media. In such instances, it is common practice to store a directory of the data store in a particular record medium or record volume (such as a data storage disk, or diskette, magnetic tape, and the like). A directory to the stored data is stored in one section of the record medium, such as low-address portion; while the data is stored in the remaining portion of the record medium, such directories have been called "Volume Table of Contents (VTOC)" or "Tape Table of Contents (TTOC)".

Both the directory and data in each record medium are updated by various recording operations. Updating data includes deleting old data. Such updating associated data deletions, leave only the latest version of the data available. The historical record of data changes becomes lost, unless separate journalling or other backup operations are employed.

Some editors, such as for editing computer programs and text processors, have a limited automatic data backup facility. For example, the IBM Disk Operating System for the IBM Personal Computer employs a line editor called EDLIN as described in the *Disk Operating System Manual*, copyright 1981, by International Business Machines Corporation, Armonk, N.Y. This line editor creates a backup file when the user submits a "ENDEDIT" command to EDLIN. The ENDEDIT command creates a backup file identified by the suffix ".BAK" with a file name. The new file, created by the editing, has the same file name but with an extension ".XXX" specified in the EDLIN command. The directory for the new file does not link it to the backup file. The user, of course, knows the name of the file and therefore can access either the new file or the backup file. The backup file is created irrespective of the extent of editing of the file, which includes, of course, no changes whatsoever.

George, et al. in U.S. Pat. No. 4,419,725 shows a cache data store connected to a backing store consisting of a disk drive or data storage unit. Whenever the cache is written into, a new directory or segment descriptor table entry corresponding to the written to data segment is created and stored with the data written to the cache. In other words, a directory entry is stored with the data in addition to having a separate directory structure. This means that in order to read the directory entry, unless one knows the exact location of all of the directory entries, the entire cache may have to be scanned. George, et al. allocate a predetermined portion of each cache storage segment area for the directory entry. This means that the data storage areas are preferably of fixed lengths such that the location in the cache of all of the newly created descriptor table entries, are easily located. When variable length data recording is provided, this luxury of a priori information on the location of the directory entry no longer exists.

Data storage directories have included in a single entry a plurality of address pointers to a like plurality of data storage locations. For example, Hunter, et al. in U.S. Pat. No. 4,419,746 includes two addresses with each directory entry, such that two different memories can be simultaneously accessed in a single instruction cycle.

With the advent of "write-once" optical storage media having extremely high data storage density, the luxury of updating and deleting directories each time data is recorded becomes an impossibility, if the directory is to be stored in the same record medium as the data itself. While one could employ a record medium having an optical portion and a magnetic portion, respectively, for storing data and directories, such an arrangement greatly increases the cost of the data recorder and, hence, is not desirable. Accordingly, for those record media having indelible characteristics (write once), it is desired to have a data storage management technique which is relatively simple for accommodating the nondelete aspects of the write once media.

Even with magnetic media, which has updatable or rewritable characteristics, the management of such data and the loss of archiving can present data processing costs; that is, various catalogues have to be constructed and stored for separately identifying where earlier versions (each version is a generation data group) of the updated sets or files of data can be found. Further, this data storage content of a volume has to be managed. Such management does require host processor and data storage control unit resources. With the cost of magnetic media being continually reduced, there is a certain attractiveness to the avoiding the resource costs of updating and deleting. Therefore, there are certain advantages in peripheral data recording of nondelete recording of data even on magnetic media, which is rewritable. Accordingly, the processes associated with nondelete recording can be applicable to wide range of data storage media.

SUMMARY OF THE INVENTION

In accordance with the invention, a self-archiving data record directory is provided with a plurality of directory entries for each file or data set that has been updated. The latest updata has an associated record directory entry pointing to all of the data set, and a reverse pointer to the record directory entry pointing to the immediately-preceding updated version of the file or data set. Each time a file or data set is updated, only that portion which is changed is updated. Therefore, each record directory entry will point to data which is the current data but which may have been actually recorded in the record medium at diverse times. The oldest, or first, entry in the record directory for the associated file or data set contains a null reverse pointer indicating it is the original entry.

The recording techniques for efficiently building a self-archiving directory include selecting a record storage medium having a given address space, having addresses from a minimum to a maximum value. On a record storage disk, the minimum address value is usually the radially-outermost record track, while the highest address is usually the radially-innermost record storage track. Preferably, all directory entries are recorded sequentially beginning at one radial extremity at ever-increasing or decreasing data storage addresses, respectively, beginning at the outermost or innermost track. The data being recorded is always recorded beginning at the address opposite the beginning address for the directory. Each successively recorded data unit is at a next sequential storage address closer to the recorded directory. When the data storage address of the last directory entry recorded and of the last data recorded reaches a predetermined address differential, then the volume or record medium is defined as being full and a special control is recorded indicating the separation of the directory entry and the data. Each addressable storage area on the record medium can be one sector of a rotatable data storing disk.

The directory entries are of variable lengths depending upon the fragmentation of the recording of the data in the respective file or data set. In a simplest form, the self-archiving directory can be limited to a single data storage volume. In another version of the invention, overflow recording from one data storage volume to another data storage volume can be handled through a simple modification of the directory structure such that the various volumes can be logically linked together. Various other features and modifications are also within the scope of the present invention.

The foregoing and other objects, features, and advantages of the invention will be apparent from the following more particular description of preferred embodiments of the invention, as illustrated in the accompanying drawings.

DESCRIPTION OF THE DRAWINGS

FIG. 1 is a simplified illustration of a disk-type of data recorder employing the present invention.

FIG. 2 is a block diagram of the FIG. 1 illustrated data recorder.

FIG. 3 illustrates a data storage medium usable in the FIG. 1 system but employing a different directory and data format on the disk.

FIG. 5 illustrates an address map for a data storage volume usable in the FIG. 1 illustrated system.

FIG. 6 illustrates an expandable directory entry for a self-archiving directory.

FIG. 7 illustrates the format of a request for accessing a data storage volume employing a self-archiving directory in the FIG. 1 illustrated system.

DETAILED DESCRIPTION

Figure 4:
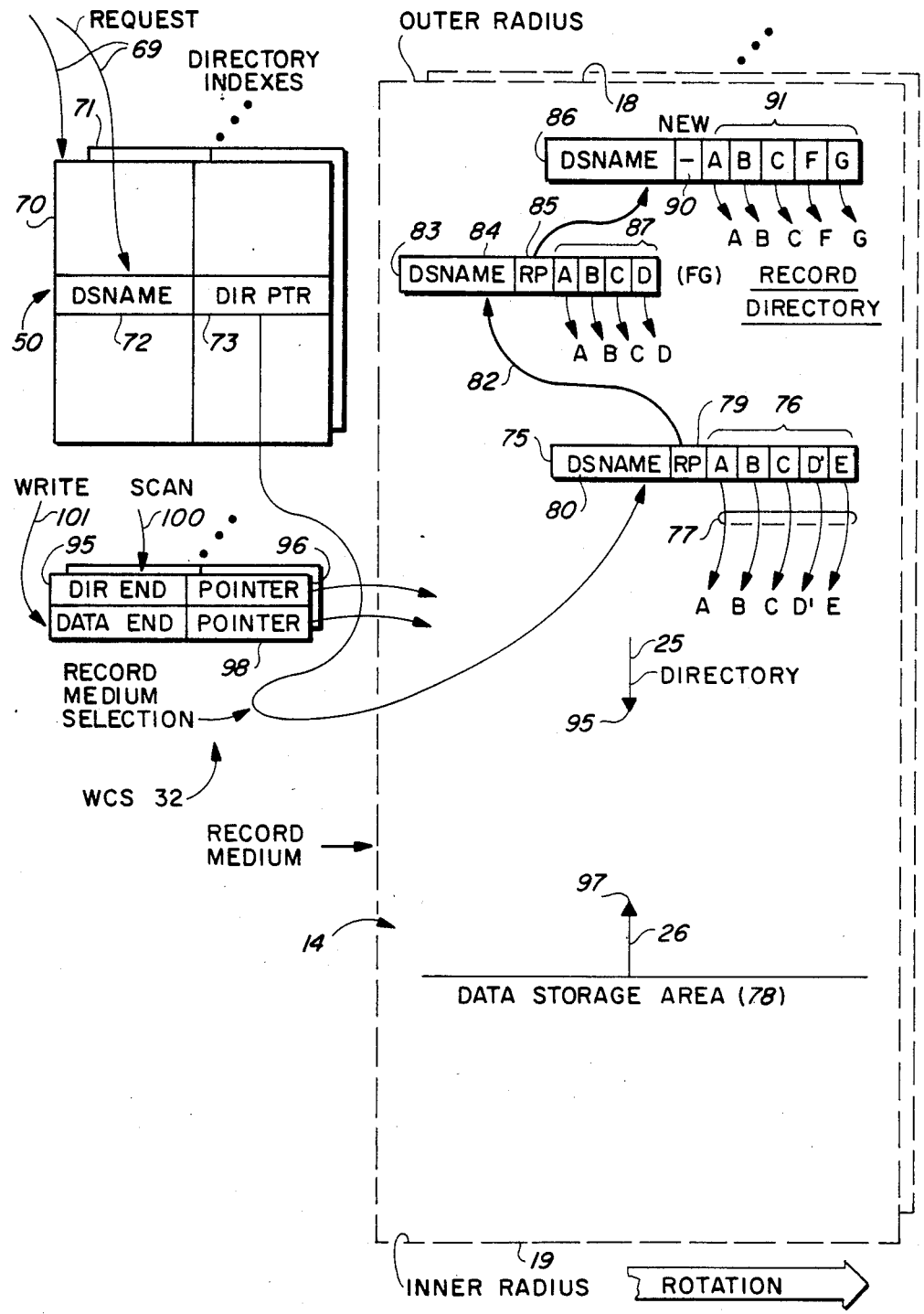
FIG. 4 illustrates an addressing structure usable with the FIG. 1 illustrated system.

Referring now more particularly to the drawings, like numerals indicate like parts in the structural features throughout the drawings. A peripheral data storage subsystem 10 includes a data storage unit 11 attached to a data storage access controller 12. Controller 12 in turn is connected to one or more host processors via a peripheral or input/output connection 13. Within the peripheral data storage subsystem 10, a plurality of data storage units 11 can be attached to one or more of the controllers 12. Each data storage unit 11 includes one or more record media 14, preferably in the shape of a circular disk. Disk 14 is removably mounted for rotation in a usual manner about an axis of rotation 15. A transducer 16 is radially movable between a radial outer extremity 18 of a recording area represented by double-heated arrow 24. The radial inward extremity 19 of the data recording area usually marks the radial inwardmost movement of transducer 16. The data recording area 24 can consist of a large plurality of concentric record tracks, each having its respectively unique radial position, or a single spiral track having portions which are addressed by position within the spiral track. Transducer 16 is coupled to data storage access controller 12 via a usual connection 17.

In accordance with the invention, a record director for the data stored in disk 14 may be constructed along the outer periphery 18 of disk 14 and as data is stored, within the disk 14, the directory grows radially inward as indicated by arrow 25. In a similar manner, the data storage begins as the inner radial extremity 19 with the radial outward data recording growth represented by arrow 26. Using normal disk addressing techniques, the directory growth represented by arrow 25 (also representing the record directory) begins at track 0, the lowest address with each new record directory entry at an ever-increasing data storage addresses. In contrast, data growth begins at the highest address and proceeds at ever-decreasing addresses. At some unpredicted radial position, the record directory 25 and data at 26 stored on the disk 14 will come to close proximity resulting in a filled disk or data volume. In an alternate embodiment, the radial positions and directions of recording for the directory and data can be reversed.

A general arrangement of controller 12 is diagrammatically illustrated in FIG. 2. It includes programmable microprocessor 31 controlled by program 33 stored in working control store (WCS) 32. These programs enable microprocessor 31 to operate the peripheral data storage subsystem 10 for receiving data for storage from host processor 30 over peripheral connection 13 and for supplying stored data requested by host processor 30 from data storage unit 11. It is preferred, but not required, that the peripheral data storage subsystem 10 includes a data buffer or cache 35 for temporarily storing data being transferred between host processor 30 and a data storage unit 11. Known caching controls for operating a cache between a host processor 30 and a data storage unit 11 can be employed. A cache directory 36 stores addresses of the data stored in data storage unit 11 and a corresponding address of the cache 35 for all data stored within cache 35. During a recording, or write operation, wherein data is transferred from host processor 30 to data storage unit 11, directory 36 may include only a cache address in that some data may be stored in cache 35 before a directory entry has been created. In this instance, a pseudo data storage unit 11 address can be employed which is out of the range of the address space for record medium 14 or the physical data storage locations can be allocated and the data recorded into the allocated locations at a later time. Preferably, microprocessor 31 through its program 33 will assign data storage addresses within data storage unit 11 for data as it is received from host processor 30 such that directory 36 always has both a data storage unit 11 address and a cache address. The data storage area addresses for data storage unit 11 use the usual track (radial position) and sector (rotational position) addressing.

Data stored within cache 35 is identified in addressable data storage areas 37, each of which includes a modification or new bit 38. Bit 38 is always set to indicate modified data whenever host processor 30 is supplying data for recording and data storage unit 11. The modification bit 38 is employed for controlling the data transfers between cache 35 and data storage unit 11 in that only new or modified data is written to the data storage unit 11.

Microprocessor 31 controls all of the elements of controller 12. Bus 40 connects microprocessor 31 to WCS 32 and cache 35 for controlling same and for providing data transfers between the microprocessor 31, cache 35, and WCS 32. Data transfers between cache 35 and data storage unit 11 are conducted via the usual data circuits 41 which provide formatting and data modulation (encoding for recording). Automatic data transfer circuits transfer data between cache 35 and data circuits 41 via bus 42 as well as between data circuits 41 and peripheral connection 13, which allows bypass of cache 35. The preferred operation for data transfers between host processor 30 and cache 35 and then between cache 35 and data storage unit 11. Data circuits 41 are controlled by microprocessor 31 in a usual manner via control lines 43.

WCS 32, in addition to storing programs 33 for microprocessor 31, also stores control data structures usable with the present invention. It is to be understood that WCS 32 will also store other control data structures not pertinent to an understanding of the present invention but which may be advantageously employed in the practical construction of a peripheral data storage subsystem 10. WCS 32 is preferably a random-access, semiconductive type of data storage unit. A directory index 50, later described, provides for a first stage accessing of data storage areas in data storage unit 11. While the directory index is shown as being within controller 12, such an index can be equally employed within host processor 30; the latter arrangement is particularly advantageous for lower-capability host processing, such as personal computers or minicomputers. The directory index 50 matches file or data set names (herein termed "DSNAME") to a record directory 25 entry either stored within record member 14 or cache 36. For updating the record directory on record medium 14, WCS 32 contains old directory entry 52 which stores the currently accessed copy of the record directory entry for record medium 14. Updated directory entry 53 stores the directory entry to be recorded in conjunction with new or updated data being supplied to the data storage subsystem 10 by host processor 30. The cooperative relationships between old directory entry 52 and updated directory entry 53 will become more apparent. The directory index 50, when stored within controller 12, can be retentively stored in rewritable retentive store 51, such as a so-called diskette or flex disk recorder, rewritable ROM (Read Only Memory), and the like. In one practical embodiment, the directory index 50 within WCS 32 contains but a portion of all the directory indices for the data storage units 11 of peripheral data storage subsystem 10.

Before proceeding to more detailed discussions of the operation of peripheral data storage subsystem 10, it should be understood that the control of record directory 25 and data storage 26 growth within a record medium 14 can use several arrangements. For example, it is well known that many actuators for moving a transducer 16 radially of disk-type record members have a much faster track-to-track head moving capability than at either radial extremity 18 or 19 of the record member. Accordingly, it may be desirable to store the record directory for the record medium centrally of the radial extent of the data storage area. In FIG. 3 a dashed line circle 60 represents a reference radius which corresponds to a maximal actuator response position, i.e., this is the radial position where the actuator (not shown) for moving transducer 16 has the shortest track-to-track elapsed time. The record medium directory begins at reference radius 60 and is designed to grow radially outwardly as indicated by arrow 62 at ever-decreasing addresses from the reference radius 60. Initially, the data storage also begins at the reference radius 60 with additional data recording moving inwardly as indicated by arrow 61 also labeled "data-1" until the inner radius 19 has been reached. Additionally, data storage can begin at the radially outward extremity 18 with the data storage proceeding sequentially radially inward as indicated by arrow 63. Other geometric arrangement may also be employed.

The sequence of addressing for accessing data storage sections of record medium 14, particularly with the dynamic directory's growth for the record medium and the self-archiving aspect is best understood by referring to FIG. 4. Access requests received from host processor 30 for accessing the data storage medium 14 are indicated by arrows 69. When a given request includes a file or data set name DSNAME, then microprocessor 31 through its programs 33 accesses the directory index 50 scanning for DSNAME. Once a match is found, then the corresponding pointer to the record medium 14 directory (DIR PTR) 73 enables microprocessor 31 to access the most recent directory entry for DSNAME; in the illustration, this is shown as directory entry 75, which contains DSNAME 80.

Since data storage unit 11 has a large capacity for storing data, it may be more efficient to have a plurality of directory indices and effectively provide a plurality of addressable logical or virtual data storage volumes. It is preferred that no special areas for the various virtual data storage volumes be assigned; rather, it is preferred that the actual data storage be independent of such virtual volume addressing or any use of subdirectories. In the latter instance, directory index 50 includes a plurality of virtual directory indices 70, 71, etc. In this situation, host processor 30 in its request 69 selects one of the virtual directory indices. When a plurality of host processors share a data storage unit 11, each of the host processors may have its own individual directory index; microprocessor 31 through its programs 33 can recognize which host processor has supplied the request and therefore translates the host processor identifications to the appropriate respective directory index 70, 71, etc. The virtual volumes may also be assignable to processes, virtual machines or other logical entity of one or more host processors 30. In any event, a directory index 50 has a DIR PTR 73 pointing to the most recent record medium 14 directory entry corresponding to the supplied DSNAME.

The record medium 14 directory 25 has a plurality of directory entries for various files and data sets all randomly interleaved as determined by the sequence of recordings which can be independent of any data organization. For purposes of illustration, three directory entries are shown as being reversably linked with backward pointers for a given DSNAME 72 are shown. It is to be understood that intermediate to these three directory entries are unrelated directory entries for other files and data sets not shown. Once microprocessor 31 has accessed directory entry 75, using directory index 50, DSNAME entry 72, and pointer 73 and its programs 33, determines the actual status of all data stored in record medium 14 corresponding to DSNAME 72. In record directory entry 75 pointed to by DIR PTR 73, reverse pointer RP 79 reversably points to previous directory entry corresponding to the next earlier version of DSNAME 72. Each record directory 25 entry has such a reverse pointer. In entry 75, numeral 76 indicates a plurality of data storage pointers A through E corresponding, respectively, to various fields and records of DSNAME 72 that are the latest versions of the data for that file or data set. Numeral 77 collectively designates the address pointers for the respective records A through E. For purposes of illustration only, records A, B, C and E may be the first data recorded. Record D' indicates that it is an updated version of record D. The symbol D' indicates that penultimate directory entry 83 pointed to by RP 79 as indicated by arrow 82 contains pointers to data D, which are different and earlier versions than record D'. Accordingly, changing but one record of a file or data set causes a new record member 14 directory entry 75 to be made. The records A, B, C, and E remain unchanged as do the data pointers. In the illustrated updating or DSNAME, as represented by record member directory entry 83, data pointer D is updated by data pointer D' for pointing to the updated record.

Penultimate record directory entry 83 includes DSNAME 84 identical to DSNAME 72 and 80. Entry 83 has a reverse pointer RP 85 pointing to the antepenultimate record directory entry 86. Numeral 87 denotes data pointers A through D for the data within the file or data set corresponding to record directory entry 83. Note that record E is new to entry 75; a new record was added to DSNAME at the same time record D was updated. The alphabetic characters F and G in parentheses adjacent record directory entry 83 indicate that records F and G found in the antepenultimate entry 86 have been deleted from DSNAME 83. In antepenultimate record directory entry 86 the reverse pointer area 90 has a null indicating that entry 86 represents the first recording of the file DSNAME within record member 14. As later described, a special character or set of characters can be inserted in area 90 for indicating another record medium (not shown) containing prior recordings of the respective file or data set. Numeral 91 indicates the data record location pointers A through C, F and G, which represent the first data contents of the file DSNAME recorded on record medium 14.

Directory 25 grows in the direction of the arrow within in FIG. 4, which in FIG. 1 extends from the outer radius 18 toward the inner radius 19. Point 95 represents the highest address of any record directory entry currently recorded in record medium 14. To identify the location of point 95, microprocessor 31, within WCS 32, has a directory end pointer 96 pointing to location 95. Similarly, the data storage area 78 begins at the inner radius 19 and proceeds radially outward as indicated by arrow 26 with the last data being recorded at the lowest data storage address 97 storing data. A data end pointer 98 in WCS 32 includes an address pointer which points to address 97 enabling microprocessor 31 to easily record additional data in data storage area 78 at ever-decreasing data storage addresses. For a received write request 101, microprocessor 31 accesses data end pointer 98 to establish the data storage sector to begin receiving data to be recorded in record medium 14 and updates the appropriate pointer when a data storage section is written into. The same process is used for writing a new directory 25 entry. For a read operation, or for scanning the contents of the record medium 14, as indicated by numeral 100, microprocessor 31 will begin the scan of the directory 25 at the directory end (DIR END) through the use of pointer 96 and proceed radially outwardly toward the outer radius 18 to identify recorded data.

As indicated in FIG. 4, more than one record medium 14 can be employed in a peripheral data storage subsystem 10. Accordingly, DIR PTR 73 of the directory indices 70, 71, etc., may include a record medium 14 selection control as indicated by the arrow extending between DIR PTR 73 and DSNAME 75. Such selection control is the same as selecting data storage volumes in current data processing systems.

The actual storage format of record directory entries and data in a record medium 14 employing concentric radially-spaced record tracks is shown in FIG. 5. The first record directory for record medium 14 is described as beginning at the outer radius 18. The width of the FIG. 5 illustrated address space corresponds to one record track in extent while the vertical ordinate corresponds to various radial positions of the individual record tracks. The first data recorded in record medium 14 are entry Q, which contains the pointer to data-Q-A, the first data record of data set Q. Entry-W is for a different file or data set and corresponds to data-W-B in the data storage area 78. Entry-X corresponds to and points to data-X-A.

Entry-Q' indicates a modification was made to the previously recorded file or data set represented by entry-Q. This change corresponds to the deletion of data records Q-F and Q-G and the addition of Q-D. Entry Q" corresponds to data Q-D', a modification of data Q-D. For example, entry-Q" can correspond to the entry 75 of FIG. 4, wherein four of the five records A, B, C, and E were unchanged and record D was changed to D' such that data-Q-D' corresponds to record D, while data-Q-A through Q-C corresponds to records, A through C. This indicates that the pointers A, B, C remain unchanged while data D is changed to pointer D' and pointer E was added. D' and E correspond to data-Q-D' and Q-E of FIG. 5. Entry-X corresponds to a file containing data-X-A. Entry-Z corresponds to data-Z-A. The physical size of the record directory 25 entries are enlarged with respect to the size of the data recording areas for purposes of illustration only. Directory end 95 is indicated at entry-Q", while the end of the data is indicated at 97 at data-Q-E. As additional data are recorded in record medium 14, the data storage area 78 grows radially outwardly to meet the radial inward growth of record directory 25. When the highest address of the last record directory entry and the lowest address of last data recorded reaches a predetermined minimal differential, the record medium 14 is declared as being filled. At this point in time, directory and data end 105 is recorded intermediate the then current ends 95 and 97. The directory end ID 106 and the data end ID 107 can include control information, known special patterns such as used for interblock gaps in data recording, or contain other information as may be desired.

Once record medium 14 is filled with data, microprocessor 31 should be able to quickly find the latest entry of the record directory. While this can be achieved by using the above-described directory indices, it may be that record medium 14 is transportable and, hence, the directory indices may not be available to a controller 12. To facilitate access to a filled record medium 14, an end pointer 108 is recorded in one sector of track zero, the radially outwardmost record track in a sector reserved for that end pointer before creating the record directory. Accessing a filled record medium 14 proceeds by first finding the end pointer 108 and then proceeding directly to the latest entry for finding the latest version of the file or data set. Directory end ID 106 and data end ID 107 may contain all or some of the information normally found in a VTOC, i.e., maybe a a partial or complete replication of the directory indices 70, 71 referred to above. The latter replication facilitates a quick scan for identifying what data is stored in record medium 14 without scanning the entire record directory 25. A partial replication of indices 70, 71 can be a listing of files only, or the last recorded files up to a preset number of files, i.e., the last most active files.

FIG. 6 illustrates one version of a record directory 25 entry selected as representing directory entry 75 of FIG. 4. A header 120 includes the DSNAME 80 identification, reverse pointer 79, additional information over and above the minimum required for self-archiving can include a timestamp 121, the current size or length 123 of the file DSNAME, and additional control flags 122, now pertinent to the present invention. The data field 76 each can include, in addition to a pointer 125, a record identification ID 124, a reference indicator 135, length indicator 136 and additional control flags 138. Reference 135 can indicate the logical position of the pointed to data in DSNAME or a sequential number of the field in the directory entry and/or modification level of the data or a timestamp. Flags 138 provide the control function not pertinent to an understanding of the present invention.

A minimal content of data fields 76 for a record directory entry are pointer 125 data. Pointer 125 includes the track address 129, and the sector (rotational position on the identified track) 130 for uniquely locating the pointed to data record. Such track and sector can be the first one of several sectors of tracks storing the pointed to data. Additional information in a pointer 125 includes bits W 126 which indicate whether data has been written into the pointed to track and sector 129, 130. When plural data storage sectors, such as 2, 4, 8, etc., are assignable to one directory 25 entry, length field 136 may designate the number of contiguous sectors actually written. Bits D 127 indicates that the track and sectors 129, 130 are defective and may indicate which of several sectors are defective. Flags 128 can provide additional control information not pertinent to an understanding of the present invention. In one version of the invention, the track and sector 129, 130 pointers point to six sizes of allocation units of record medium 14. Therefore, a record of a file or data set having a required greater capacity than a single allocation unit would require a plurality of sectors 130; data pointer field 76 points to the first sector 130 employed for recording the record. In another version of the invention, the data pointer field 76 points to each individual sector allocated to the file independent of its data content. In the latter arrangement, host processor 30 accesses the first sector allocated for obtaining internal data structure indicators for accessing other data stored within the sectors. Other forms of data management and data control structure, of course, can be utilized.

As mentioned with respect to FIG. 4, some records or fields can be deleted wherein the record directory entry is data-related rather than allocation-unit-related. Such a deletion need not be noted in record directory 25 except by the absence of an entry. A delete field 140 may be optionally employed once for indicating that certain data has been intentionally deleted from the file or data set when the corresponding generation data was was recorded. Identification of the just-deleted data is in ID field 141. The fact that it is deleted is in bit 142 and the pointer to the latest version of the deleted data is at 143. Pointer 143 is constructed identically to pointer 125. The delete field 140 can be kept with the record directory 25 entry generated as a result of deleting the field or can be carried forward to all subsequent record directory 25 entries.

FIG. 6 illustrates a record directory entry for a single volume set of record directory entries. When a multivolume set is to be provided, reverse pointer 79 can include volume indicators as indicated by flags 122; that is, the reverse pointer 79 is an identification within record medium 14. When a flag (not shown) 122 indicates that the record directory entry is a first record directory 25 entry for a given record medium 14 then the data set or file has different generation sets in respect to a plurality of such record media.

FIG. 7 illustrates a host processor 30 request format usable with the present invention. The request format is shown in the form of a channel command word CCW 150 in which the first byte CMD 151 contains a code permutation representing the function to be performed by the peripheral data storage subsystem 10. Identification of a file or data set DSNAME is in field 152 while the directory index 70, 71 identification is in field 153. The directory index 153 may contain a host processor 30 identification enabling host processor virtual control of the data storage system using upon host processor identifications or processes within a host processor. Data ID 155 is optional for identifying the record within the file or data set to be accessed. Field 156 contains read/write or delete commands for the data ID 155. A timestamp 157 is optionally provided. Area 158 represents the data to be transmitted for a write and can contain additional subcommands 155, 156, 157. In a CCW, area 158 contains pointers to areas of a main memory (not shown) in a host processor allocated for use with the illustrated CCW. Some of the commands in CMD 151 may not require the subcommands, or command modifiers as above described. Of course, other request formats may also be employed.

Figure 8:
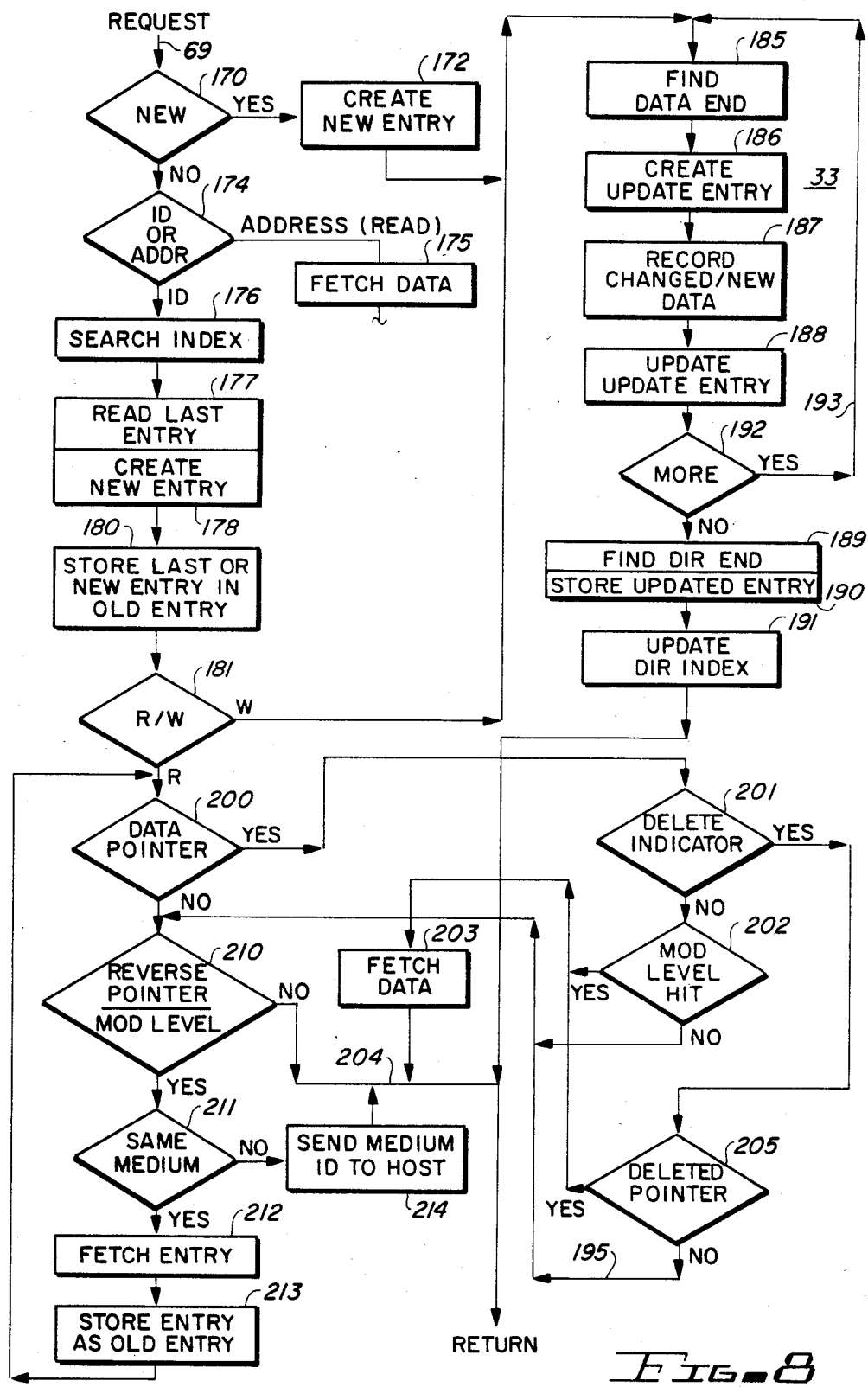
FIG. 8 is a machine operations flowchart illustrating machine operations using the invention within the FIG. 1 illustrated data storage recorder.

The machine functions performed in implementing the invention in the FIG. 1 illustrated system are shown in FIG. 8. A host processor 30 request is received at 69. At 170, microprocessor 31 determines, either from the request or by comparing DSNAME in the request with the DSNAME in the directory index 50, whether a new file or data set is to be accessed that is not currently recorded or does not have sectors allocated in record medium 14. For a new file or data set, microprocessor 31 goes to step 172 for creating a new record directory 25 entry. In this instance, within WCS 32, old directory entry 52 is blank, while updated directory entry 53 will contain the new DSNAME 152. Then the later-described machine operations for recording data are performed.

Usually, the received request will be for a DSNAME that is recorded in directory index 50. When microprocessor 31 finds a match between DSNAME 152 and a DSNAME within directory index 50, microprocessor 31 proceeds to step 174 to determine whether the current request is for accessing record medium 14 indirectly using the DSNAME 152 or directly by an address such as the track and sector addresses contained in area 158 of the request format. If the track and sector is indicated within the request, then, of course, the data already has been recorded using nondelete recording on record medium 14 indicating a read command. Then the identified data is fetched at 175, using the usual read from device to host machine operations. When the only DSNAME ID is employed, microprocessor 31 in step 176 searches index 50 for finding a DSNAME match. Assuming that a match is found (otherwise an error condition may be indicated), then at 177 microprocessor 31 accesses record medium 14 for transferring the last record directory entry from record directory 25 into the old directory entry 52 of WCS 32. Such accessing is illustrated with respect to FIG. 4. When a new directory entry is created in step 178 in area 53 of WCS 32. For example, in microprocessor 31 in processing the received request format determines at this point which record or which sectors are to be modified. After determining the location of data end point 97, the track and sector information may be entered into area 53 for updating the directory entry for the data to be modified. In the event of a read command the same procedure is followed but no new record directory entry is created.

Microprocessor 31 in step 181 determines whether the request is a read or a write. For write to record medium 14 operations, microprocessor 31 in step 185 first finds data end 97. At 186, an updated entry is created by transferring the contents of old directory entry 52 into the new work area 53. In step 187, microprocessor 31 determines whether the data supplied by host processor 30 changes a previously recorded record or is additional data. At this point, microprocessor 31 allocates, beginning at data end 97, an appropriate number of a sectors of data storage area 78 for the data to be transmitted to the record medium 14. Within step 188, the newly allocated data storage sectors are stored in area 53 which is the update to the record directory entry 25. Assuming that all of the data to be recorded has been identified, then in step 189 microprocessor 31 finds the DIR END 95. In step 190 the updated record directory entry in area 53 is recorded in one or more sectors located at DIR END 95 and adjacent to the just-previously recorded record directory entry. Then in step 191, microprocessor 31 updates directory index 50 by updating the appropriate DIR PTR 73 (FIG. 4). The updated directory entry contains a reverse pointer to the track and sector corresponding to the DIR PTR 73 to the old directory entry stored in area 52. If at step 192 it was determined by microprocessor 31 that more records have to be updated for the currently accessed file or data set, then steps 185 through 188 are repeated. Upon completion of all the recordings, steps 189 through 191 are performed. Following step 191, microprocessor 31 via logic path 204 goes to machine operations such as reporting a successful conclusion of the recording as well as other operations, as is well known in the data processing art.

For a read operation (R/W=R), microprocessor 31 proceeds from step 181 to step 200 for determining whether a data pointer to the data to be accessed is currently in the record directory entry 52. Generally, this will be the case permitting microprocessor 31 in step 201 to determine whether the entry is a deleted data entry 140. If not, the requested data is still a part of the active file. Microprocessor 31 in step 202 determines whether the received request has a modification-level indicator or timestamp 157 (FIG. 7). Without a modification-level indicator, the latest level of data (latest data generation) is accessed in step 203. If a modification-level indicator 157 is present in the received requests, then data are fetched at 203 only when the record directory 25 entry timestamp 135 corresponds to that requested modification level (viz timestamp). For a modification-level miss at step 202, microprocessor 31 follows logic path 195, an archival data line, to step 210. The record directory 25 entry stored in old directory entry 52 is examined for reverse pointer RP 79. If there is no reverse pointer, then the requested data is not within the record medium 14 and microprocessor 31 returns to machine operations not described for reporting that fact to host processor 30. Assuming that the reverse pointer exists, then microprocessor 31 at 211 for a multirecord media embodiment determines whether modification level is stored in the same record medium 14. If not, the pointer to the previous record medium is sent in step 214 to the requesting host processor 30; microprocessor 31 returns to other machine operations (not described) via path 204. If the requested modification level data are stored in the same record medium 14, then at step 212, microprocessor 31 fetches the next record directory 25 entry indicated by the current reverse pointer. That fetched record directory 25 entry is stored at step 213 in area 52 of WCS 32. Then steps 200, et seq are performed until either the data are found, or it has been determined the data are not actually stored within record medium 14.

It is not necessary for practicing the present invention to use all of the control parameters and structures illustrated in the drawing or described. For example, the reverse pointers 79, 85, and 90 may be dispensed with. In such a practice of the invention, record directory 25 is scanned for matching a DSNAME of a received request with the DSNAMEs of the respective record directory 25 entries. Upon a match, the corresponding data area can be accessed as described for FIGS. 4 and 8. Duplicate copies of the DSNAME indicate updated versions or multiple generations of the data set. Such an approach to practicing the present invention is useful in low cost systems wherein performance is not critical.

While the invention has been particularly shown and described with reference to preferred embodiments thereof, it will be understood by those skilled in the art that various changes in form and details may be made therein without departing from the spirit and scope of the invention.

What is claimed is:

1. In the method of operating a data storage unit having a continuous address space bounded by first and second addresses and respectively representing data storage areas of said data storage unit addressably accessible by addresses in said address space;

the steps of: repeatedly receiving records of diverse data for storage in the data storage unit, storing said received data in said data storage areas beginning at said first addressed data storage area and proceeding sequentially at successively addressed ones of said data storage areas toward said second addressed data storage area;

each time any of said received records of data are stored in said data storage areas, creating a record directory entry having an identification of the received and just stored records of data and an address pointer identifying the data storage area in which said received and just stored records of data are stored; and storing said created record directory entries respectively in data storage areas of said data storage unit beginning at said second address and storing successively created ones of said entries respectively at successive addressed ones of said data storage areas beginning at said second address and proceeding sequentially toward said first address.

2. In the method set forth in claim 1, further including the steps of:

identifying groups of said records of data as data sets;

creating a one of said record directory entries for each of said data sets with each of said created directory entries including address data for all of said records in said identified groups, respectively;

changing a one of said records in a one of said identified groups; and creating a non-delete record directory entry for the respective data set including address data of said one record directory entry for said one identified group of all records not changed and address data for said changed one of said records and deleting the address data of said one record directory entry for said one identified group of said record that was changed and not deleting the the last mentioned record from said data storage unit nor said one record directory entry for said one identified group.

3. In the method set forth in claim 2, further including the steps of:

receiving a fist plurality of changes to a corresponding first plurality of records stored in said data storage unit and storing said received changed records as set forth in claim 1 without deleting any recorded records of data in the data storage unit; and creating a second plurality of said non-delete record entries using the ultimate step of claim 2 for changes to records in a corresponding second plurality of said identified groups corresponding to said plurality of changes.

4. In the method set forth in claim 3, further including the step of:

in each of said non-delete record directory entries storing an address pointer indicating the storage address of a record directory entry for the corresponding data set having address data for the records being changed.

5. In the method set forth in claim 4 wherein the method is performed in a data storage unit having a rotatable record storage disk with a data receiving surface means with a plurality of record track shaped and addressable data storage areas in the data receiving surface means and having a radially outwardmost and radially inwardmost record portions, including the steps of:

identifying a one of said track shaped data storage areas in each of said record portions respectively by said first and second addresses;

comparing the address used for last storing a record of data with the address used for last storing a created non-delete record directory entry, when said comparison indicates a predetermined closeness of said compared addresses, indicating that the data receiving surface means is filled, otherwise continue storing any received records of data.

6. In the method set forth in claim 5 further including the step of:

when indicating said data receiving surface means is filled, storing in said data receiving surface means an index to said created non-delete record directory entries having the identifications of said groups associated with the address of the last created ones of the record directory entries, respectively.

7. In the method set forth in claim 5 further including the step of selecting said data receiving surface means to have write once data storage characteristics.

8. In the method of operating a data processing apparatus having a data storage unit having a plurality of addressable data storage areas;

the steps of:

repeatedly receiving records of diverse data for storage in the data storage unit, each of said received records of data having an identifying name therewith, a plurality of received records sharing a common identifying name, some of said received records are being received to update predetermined ones of records currently stored in the data storage unit, respectively, while others of said currently stored records are not being updated;

creating a record directory entry for all of said received records having a common identifying name and which were concurrently received, including in each said created record directory entry said common name and the addresses of the data storage area of all records stored in said data storage unit having said common name, which are not being updated by said concurrently received records, irrespective of time of receipt and storage of such included records and including said currently received records; and storing each said created record directory entry in a data storage area of said data storage unit and retaining in said data storage unit all current copies of the directory entries and of concurrently stored data.

9. In the method set forth in claim 8, further including the step of:

in each of said created record directory entries storing an address pointer indicating the data unit storage address of a record directory entry for the corresponding common name having address data for the records being updated.

10. In the method set forth in claim 8 wherein the method is performed in a data storage unit having a rotatable record storage disk with a data receiving surface means having a plurality of record track shaped and addressable data storage areas in the data receiving surface means and having radially outwardmost and radially inwardmost record portions, including the steps of:

identifying a one of said record track shaped data storage areas in each of said record portions respectively by first and second addresses of said data storage unit for defining the extremities of said data receiving surface;

storing said data on said data receiving surface beginning at an addressed data storage area identified by said first address and storing ensuing received records of data at addressed data storage areas identified by addresses numerically approaching said second address; and storing said directory entries at addressed data storage areas beginning with said second address and storing successively created record directory entries in data storages areas having a sequence of addresses proceeding numerically from said second address toward said first address.

11. In the method set forth in claim 10, further including the steps of:
- comparing the address last used for storing said received data with the address last used for storing a created record directory entry; and
- when said comparison indicates a predetermined numerical closeness of said compared addresses, indicating that the data receiving surface means is filled, otherwise continuing to store any subsequently received records of data.

12. In the method set forth in claim 11 further including the step of:
- when indicating said data receiving surface means is filled, storing in said data receiving surface means an index to said created non-delete record directory entries having the identifications of said groups associated with the address of the last created ones of the record directory entries, respectively.

13. In the method set forth in claim 12 further including the step of selecting said data receiving surface means to have write once data storage characteristics.

14. In a data processing apparatus including data storage means for storing data, in combination:
- a data storage unit having a large plurality of data storage areas addressable by addresses in an address space bounded by first and second addresses with the addresses in the address space being sequentially increasing from the first address to the second address;
- data receiving means connected to said data storage unit for supplying records of data thereto for recording in predetermined ones of said data storage areas, data set means in said data receiving means for identifying said supplied data by record and data set names and for supplying data processing commands which indicate data processing operations, such as recording supplied data, to be performed;
- record directory control means connected to said data receiving means including said data set means for responding to said data set means supplied data set name to identify a stored copy of data in said addressable data storage areas identifiable by said supplied data set name, record directory creating means in said record directory control means for creating record directory entries and connected to said addressable data storage areas for storing said created record directory entries, fetching means in said record directory control means connected to said addressable data storage areas for fetching a record directory entry identified by said data set means supplied data set name, merge means in said record directory control means connected to said fetching means and to said receiving means and to said record directory creating means for transferring address pointers from said fetched record directory entry of all records represented by said receiving means supplied data set name that do not correspond to any of said supplied records of data to said record directory creating means such that said record directory creating means creates a record directory entry containing addresses of all records stored in said data storage unit related to said supplied data set name whether supplied by the receiving means or currently stored in the data storage unit and not corresponding to supplied records which update records currently stored in the data storage unit and said record directory creating means storing the just created record directory entry in a unused one of said addressable data storage areas and maintaining a copy of said fetched record directory entry in its data storage area; and
- storage control means connected to said data receiving means and to said data storage areas for storing supplied records only in unused data storage areas while maintaining storage of all previous copies of such supplied records whereby the data storage unit stores supplied records and creates record directory entries without deleting any previously stored record directory entries or records of data.

15. In the data processing apparatus set forth in claim 14 further including in combination:
- a microprocessor connected to said data receiving means connected to said data set means for receiving said data processing commands and connected to said data storage unit for supplying device commands thereto for causing said data storage unit to receive and supply data and to perform other device operations;
- a control store connected to said microprocessor for storing programming indicia to enable said microprocessor to perform control operations to cause the data processing apparatus to function as a data storage subsystem;
- first program indicia in said programming indicia for enabling said microprocessor to be said record directory control means when executing said first programming indicia; and
- second program indicia in said program indicia for enabling said microprocessor to be said storage control means when executing said second program indicia.

16. In the data processing system set forth in claim 15 wherein said storage control means as embodied by said microprocessor and said second indicia further includes reverse pointer indicia for enabling said microprocessor to store all of said supplied records of data in said data storage unit addressable data storage areas beginning at the addressable data storage area denominated by said first address and then ensuing supplied records of data at successively addressed ones of said addressable data storage areas numerically proceeding from said first toward said second address and to store all of the created record directory entries in said data storage unit beginning at the addressable data storage area denominated by said second address and ensuing ones of said created record directory entries in successive ones of said addressable data storage areas respectively denominated by a sequence of said addresses proceeding from said second address toward said first address, and address compare indicia in said second indicia for enabling said microprocessor to compare the addresses last used to store a record of data and a created record directory entry for indicating that the data storage unit is filled whenever the comparison indicates a predetermined closeness of said two last addresses such that the microprocessor then stops storing any ensuing supplied records of data in said data storage unit.

17. In the data processing system set forth in claim 16 wherein said data storage unit is a disk recorder having a rotatable record storage disk with a data receiving surface having an inner radius at which an inner given one of said data storage areas is located and is addressable by a one of said bounded addresses and having a outer radius at which an outer given one of said data storage areas is located and is addressable by another one of said bounded addresses.

18. In the data processing system set forth in claim 17 wherein said rotatable record storage disk is removably mounted in said data storage unit, said data receiving surface exhibits write-once data recording characteristics, and said data storage unit has optical data recording and sensing apparatus.

19. In the data processing system set forth in claim 18 wherein said data receiving means includes a random access data buffer with a plurality of cache storage areas for respectively temporarily storing records of data to be supplied to said data storage unit and having a cache directory identifying data stored in the data buffer using said supplied record and data set names; and
 a working store connected to said microprocessor for temporarily storing said fetched record directory entries and said created record directory entries.

20. In the data processing system set forth in claim 19 further including a directory index in said working store, said directory index including a list of said data set names for data stored in said data storage unit, the address of the data storage area storing the record directory entry last created for the data represented by the respective data set name being stored with each of said index data set names, respectively.

21. For a data storage unit having a data storage area with a given continuous address space identifiable from area zero to area end, a directory for identifying the locations of data stored in said data storage unit by using said continuous address space, including, in combination:
 a first entry stored in said data storage unit in a first data storage area of said data storage unit and containing an identification of a group of related records of data stored in the data storage unit and a plurality of address pointers of said continuous address space pointing respectively to data stored in the data storage unit at diverse ones of said data storage areas and the extent of data storage space storing said first entry being a first extent determined by a fixed amount of data storage space plus a second extent determined by the number of pointers to the stored data; and
 a second entry stored in said data storage unit in a second data storage area of said data storage unit and spaced from said first data storage area so that the addresses of said first and second data storage areas are not successive addresses in said continuous address space, said second entry having said identification of data stored and a plurality of address pointers of said continuous address space pointing to stored data stored in said data storage unit as indicated in said first entry by predetermined ones of its said data address pointers, said predetermined ones being less than the number of data address pointers of said first entry and including additional data address pointers to data stored in said data storage unit since said first entry was stored in said data storage unit except that some of said additional address pointers point to stored data as an update of data currently stored in said data storage unit.

22. The invention set forth in claim 21, further including in combination:
 said first and second entry being an entry pair;
 a plurality of said entry pairs respectively identifying and having address pointers to a like plurality of said groups of related stored records of data; and
 all of said first and second entries being stored in respective ones of said data storage areas that are addressable in a sequence of addresses determined by the time of storage of the respective entries and independently of the informational content of any of said entries.

23. The invention set forth in claim 22, further including in combination:
 all of said entry pairs being stored in successively addressed ones of said data storage areas beginning at a first address and all of said stored records of data being stored in successively addressed ones of said data storage areas beginning at a second address which is different than said first address.

24. The invention set forth in claim 23, further including in combination:
 a record storage disk having a data storing surface means with a inner given data storage area located at an inner radial extremity of the data storing surface means and an outer given data storage area located at an outer radial extremity of the data storing surface means; and
 a first one of said given data storage areas being addressable by said first address and a second one of said given data storage areas being addressable by said second address.

25. The invention set forth in claim 24 wherein said record storage disk data storing surface means exhibits write-once data storage characteristics.

* * * * *